Patented Dec. 19, 1944

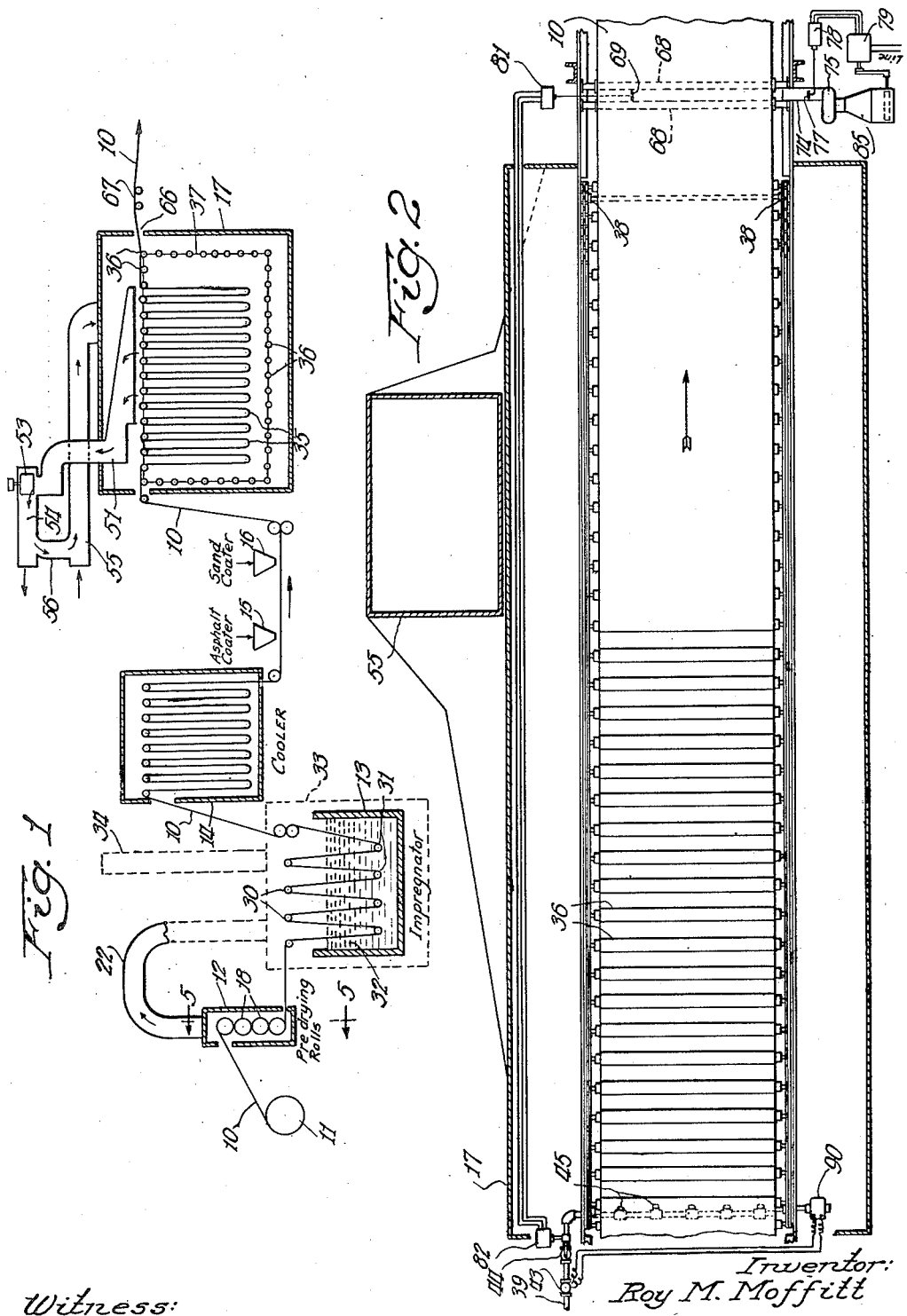

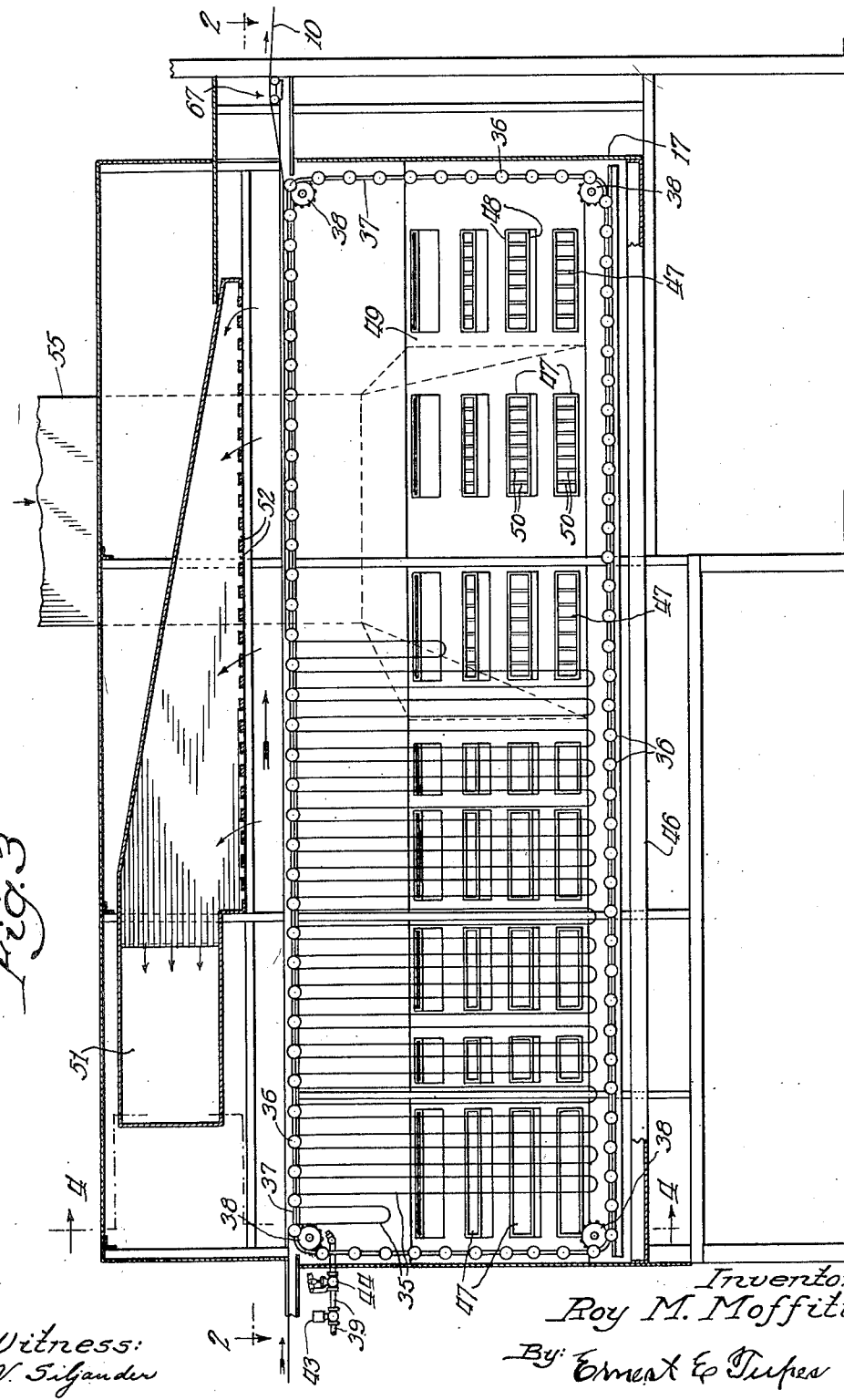

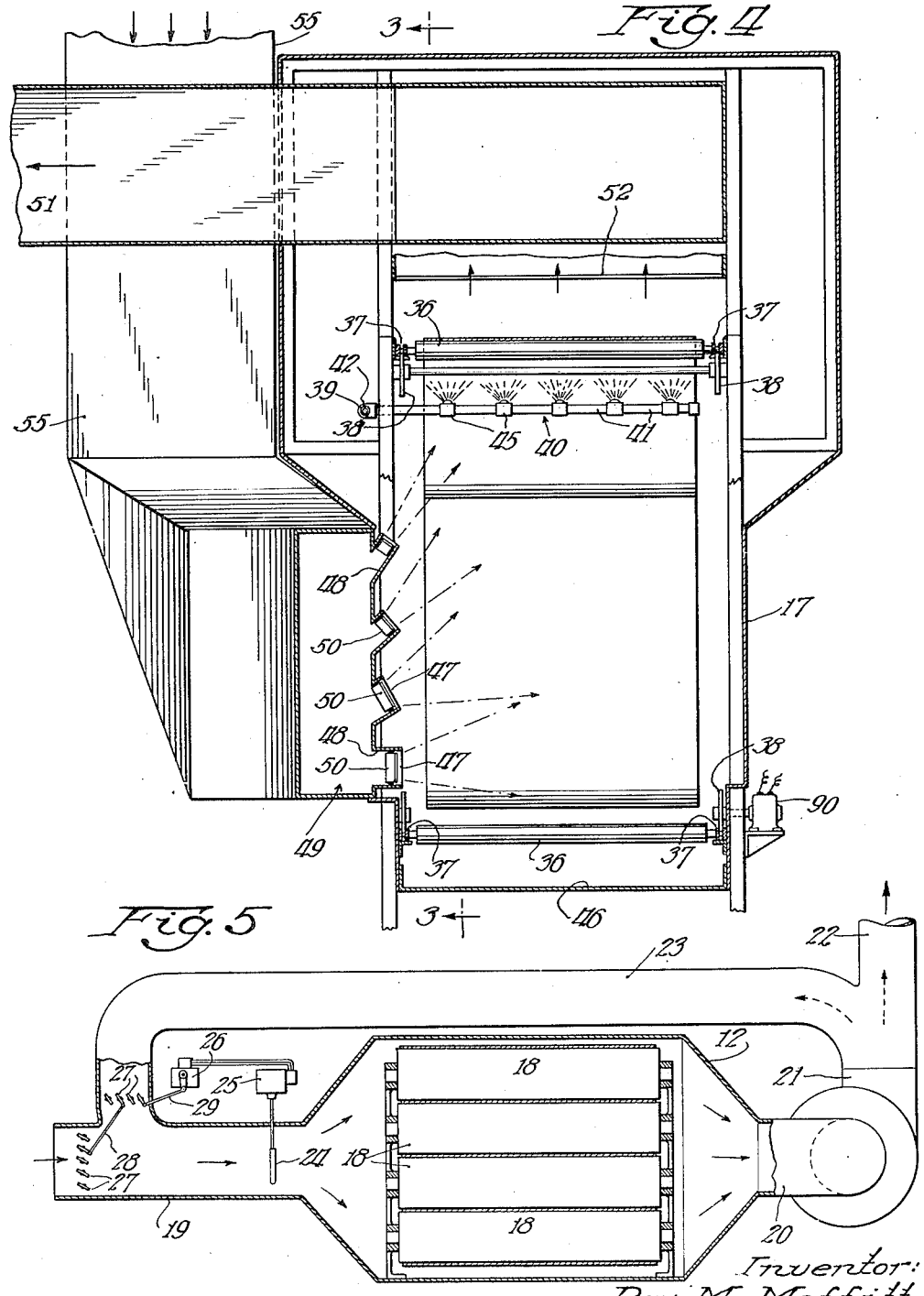

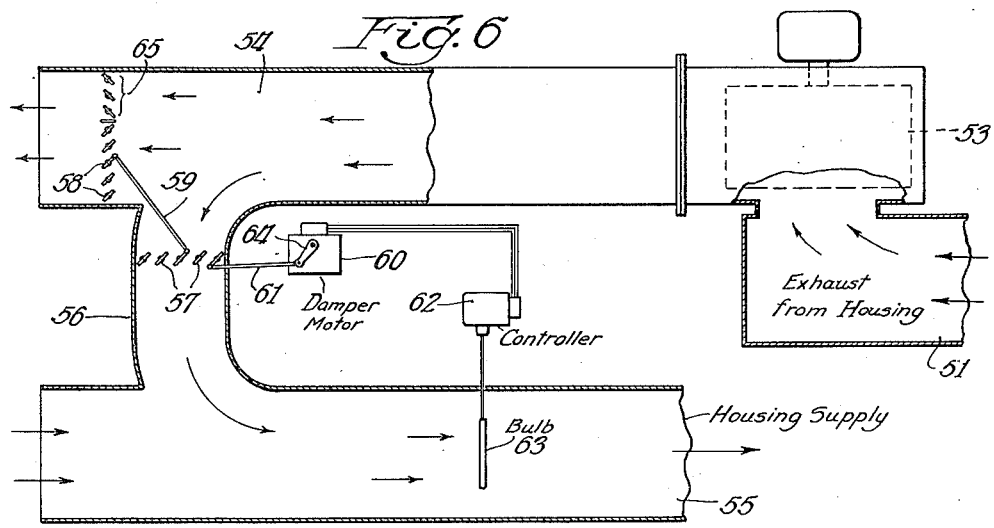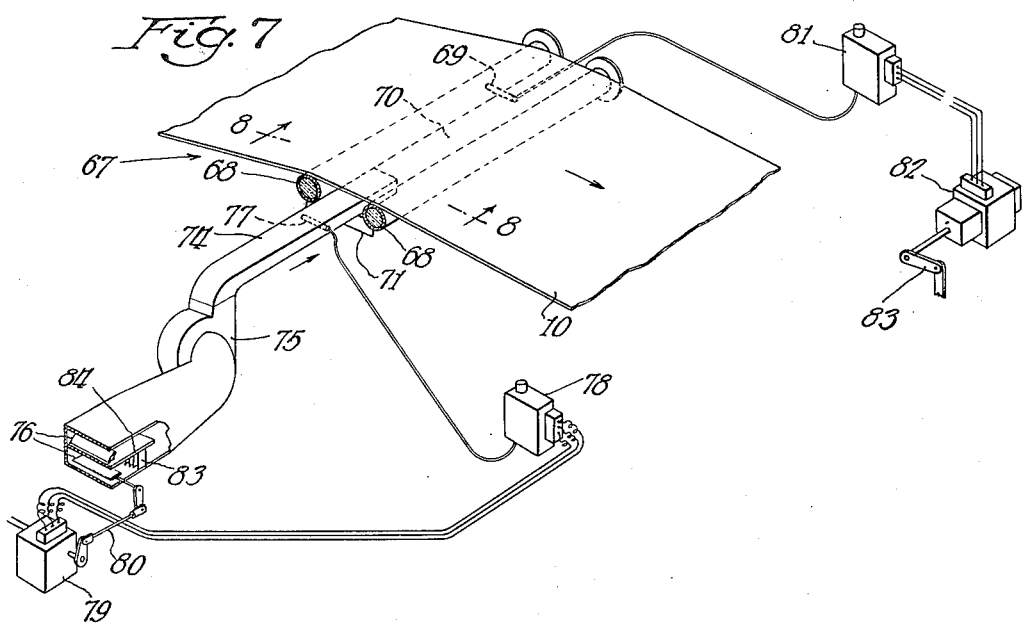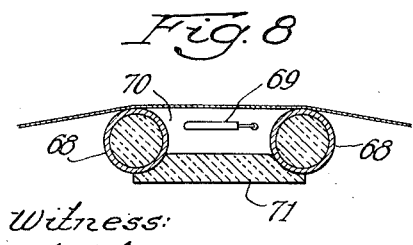

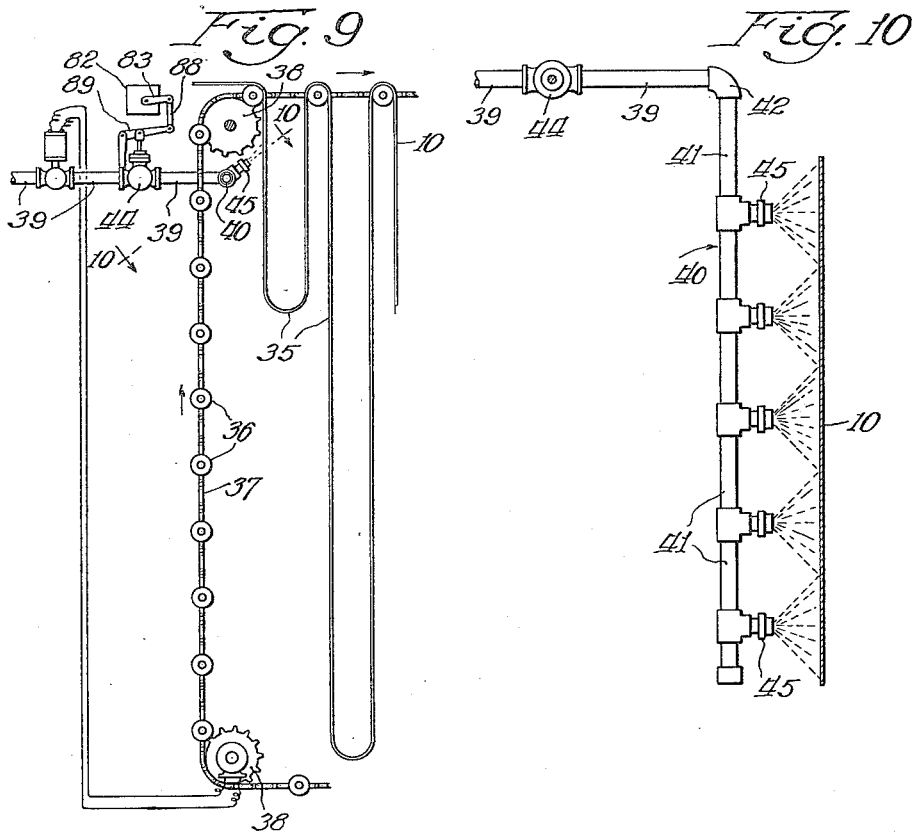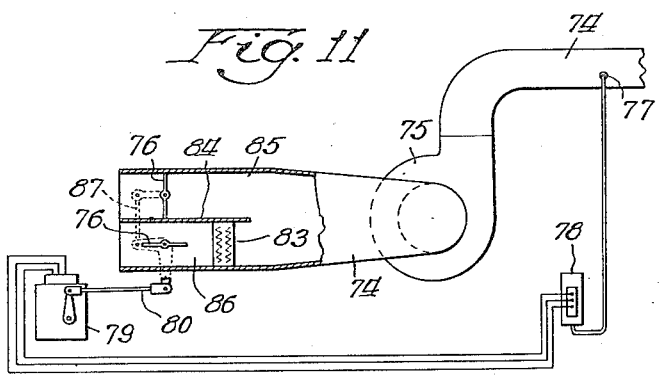

2,365,352

UNITED STATES PATENT OFFICE 2,365,352

METHOD AND APPARATUS FOR DRYING AND COOLING ROOFING AND SIMILAR MATERIAL

Roy M. Moffitt, Chicago, Ill., assignor to Reichel & Drews, Inc., Chicago, Ill., a corporation of Illinois Application August 18, 1941, Serial No. 407,316

22 Claims. (Cl. 62—168)

The invention relates to apparatus and to methods for treating sheets of felt, paper, or similar material to provide a finished product such as asphalt roofing and the like. More particularly the invention relates to apparatus and to methods for cooling the material after impregnation, unaffected by atmosphere or weather conditions.

As is well known to those familiar with the manufacture of asphalt and similar roofing material, relatively long sheets of the raw stock are continuously advanced to subject them to drying, impregnating, and cooling processes in the sequential order named and as a preliminary to the sheets being formed into rolls or cut into shingle strips at temperatures preferably between 75° and 100° F. During hot humid weather the rate of operation as hitherto practiced is slowed down substantially with the result that the cost of production is greatly increased. Movement of the material at a rate of approximately 600 feet per minute is found in practice to be most satisfactory and conducive to efficiency and economy in production and handling of the rolls or strips of the completed product. The apparatus for and method of finally cooling the finished roofing paper through the present invention as hereinafter described enable production to continue uninfluenced by changes in atmospheric temperature and humidity.

It is customary practice in some cases to cool the hot finished product, by suspending it in festooned loops from bars attached to moving continuous chains or similar devices. In other cases the material is cooled by moving it into contact with water cooled rolls prior to and in addition to the festoon practice and this is admittedly of no material benefit in increasing or controlling the rate of cooling.

Another object of the invention is the provision of a novel method and apparatus automatically operable to cool the hot finished product to a selected temperature independently of weather conditions by passing the product through a housing wherein moisture preferably in the form of sprays in varying amounts and air having controlled temperature limits are either directly impinged upon or otherwise operate to cool the sheet.

It is another object of the invention to automatically control and fix the temperature of the air entering the cooling chamber or housing independently of atmospheric temperature. This is accomplished by establishing a fixed dry bulb temperature for the entering air at the site of manufacture and providing proportioning dampers, which mix fresh or make-up air from outdoors with air re-circulated from the cooling chamber in such quantities and proportions as will result in the selected dry bulb temperatures, whereby weather and other extraneous conditions otherwise affecting the rate of cooling are eliminated as influencing factors.

A further object of the invention is the provision of automatically controlled means adapted to vary the amount of moisture sprayed over or otherwise delivered to the product in accordance with the cooling requirements as determined by the temperature thereof as it leaves the cooling chamber, the variation in the rate of delivery of the cooling water being such as to correspond to variations in the rate the product is discharged from the cooling chambers, variations in temperature of the product as it enters the cooling chamber, variations in the mass of the product to be cooled, and possible variations in other external conditions.

A still further object of the invention is the production of apparatus of the kind described which is convenient, inexpensive to manufacture, adapted to be economically operated, durable and satisfactory for use wherever found applicable.

Many other objects and advantages of the invention herein shown and described will be obvious to those skilled in the art from the disclosure herein given.

To this end my invention consists in the novel methods and the novel construction, arrangement and combination of parts herein shown and described and more particularly pointed out in the claims.

In the drawings wherein like reference characters indicate like or corresponding parts:

Fig. 1 is a diagrammatic illustration of apparatus embodying the principles of the invention and by means of which the novel methods or processes for manufacturing roofing and like articles of the kind described are utilized;

Fig. 2 is a horizontal section taken along the line 2—2 of Fig. 3 and illustrates a portion of a cooling chamber forming part of the apparatus;

Fig. 3 is a vertical section taken along the line 3—3 of Fig. 4;

Fig. 4 is a transverse sectional view through the cooler housing taken along the line 4—4 of Fig. 3;

Fig. 5 is a view to a larger scale taken along the line 5—5 of Fig. 1;

Fig. 6 is a sectional view of certain details of apparatus for mixing and controlling the air delivered into the cooling chamber;

Fig. 7 is a perspective view of apparatus at the discharge end of the cooling chamber for control of the water delivered thereto;

Fig. 8 is a view along the line 8—8 of Fig. 7;

Fig. 9 is an elevational view of valve mechanism at the ingress end of the cooling chamber for controlling the volume of water delivered to the chamber;

Fig. 10 is a view along the line 10—10 of Fig. 9; and

Fig. 11 is an elevational view partially in section of certain devices shown in perspective in Fig. 7.

In the manufacture of asphalt coated felt material the usual sequence of operations includes, removing moisture from the raw stock of felt; impregnating the felt with asphalt at a temperature of about 400° F.; cooling the impregnated felt to about 200° F.; applying a hot coating mixture to one surface of the felt; applying rock granules of various colors and in various patterns to the surface of the coating mixture, pressed well into the mixture while it is still hot, applying mica, as a lubricant, to the untreated side of the coated felt, cooling the finished product to between 75° and 100° F.; cutting the product into shingle or other shapes for forming rolls or packages of merchandisable dimensions; and packaging in bundles, rolls or otherwise. Referring now more particularly to the drawings forming a part of the specification, Fig. 1 diagrammatically illustrates apparatus adapted to perform the usual sequence of operations, and in addition it includes certain novel apparatus which in combination is adapted for carrying out certain novel processes embodying the principles of the invention.

As shown diagrammatically in Fig. 1, a sheet 10 of raw felt stock is unwound from a roll 11 and is advanced in sequential order through a pre-drying chamber 12, an impregnator vat 13, a preliminary cooling chamber 14, an asphalt coater 15, and a sand coater 16 and then into a cooler housing 17. It is understood that the entire apparatus is suitably housed and that the impregnator vat 13 is positioned in a housing 33 shown in dotted lines. The preliminary cooling chamber 14, and the asphalt and sand coaters, respectively designated by the numerals 15 and 16, are individually enclosed by suitable housings or casings not shown. It is also understood that the sheet 10 is advanced in contact with numerous idler and positively actuated rolls. The rolls are shown but not described, and the apparatus for actuating the rolls is neither shown nor described, since they form no part of the invention, and may be of any suitable and well known construction.

The initial step of pre-drying is accomplished by passing the sheets 10 of felt or similar material through the drying chamber 12 wherein they are passed around and between a plurality of rolls 18 revolved by any suitable means and heated in any suitable manner. The apparatus for revolving and heating the rolls 18 is not shown but it is understood that any suitable means for heating by steam, electricity or gas may be utilized and since means for revolving and for heating rolls is old and well known in the art no disclosure is made thereof.

The temperature and humidity of the atmosphere are factors which vary with the seasons and in many cases vary from day to day, if not from hour to hour. Without providing some special means of control, the rate of evaporation of the moisture content of the sheets 10 is affected by the temperature and the humidity of the atmosphere. Since a substantially constant rate of operation is essential to efficiency and to minimum cost of production and since the rate of operation necessarily depends upon the rate at which the initial step of evaporation of moisture from the sheets 10 is accomplished, it is obvious that the desired uniform rate of production can only be achieved by elimination of atmospheric temperature and humidity as factors influencing the rate of drying of the product in the chamber 12. This is accomplished by maintaining a uniform vapor pressure and temperature differential between the product and the environment.

The elimination of atmospheric temperature and humidity as factors influencing the rate of drying is accomplished as shown in Fig. 5, by delivering air at a fixed dew point into the chamber 12 through a conduit 19. The air so delivered into the chamber 12 is discharged through a conduit 20 by operation of a blower 21. The blower 21 discharges into a conduit 22 connected with the delivery conduit 19 by a by-pass duct 23.

Operation of the blower 21 draws outside air through the open end of the delivery conduit 19 and tends to re-circulate a portion of the air discharged by it into the conduit 20, through the by-pass duct 23. A fixed dew point of the air entering the chamber 12 through the conduit 19 is obtained by means of a combination of elements including a wet and dry bulb thermostat 24, positioned in the conduit 19 and set for a selected fixed dew point. The thermostat 24 is adapted to actuate a thermostatic control 25 operatively connected with a reversing damper control motor 26. The motor 26 is operatively connected with a damper comprising a plurality of vanes 27, some of which are connected and tiltably mounted in the by-pass duct 23 and others of which are connected and tiltably mounted in the conduit 19 and adjacent its open end. The set of vanes 27 positioned in the duct 23 are operatively connected with the motor 26 by means of a rod 29 and are also operatively connected with the vanes 27 in the conduit 19 by means of a rod 28. The rods 28 and 29 have pivoted connections at each end and are so arranged that operation of the reversing motor 26 in one direction tends to close the vanes 27 in the duct 23 and tends to open the vanes in the conduit 19. Likewise, operation of the motor 26 in the opposite direction tends to open the vanes in the duct 23 and to close the vanes in the conduit 19, the arrangement being such that when the duct vanes are completely closed, the conduit vanes are fully open and vice versa.

The wet and dry bulb thermostat 24 is set to control the motor 26 at any desired dew point above a selected maximum. Assuming that the maximum dew point at the site of manufacture is 67° wherein each pound of air carries approximately 100 grains of moisture, the thermostat 24 is set to control at 70° dew point at which temperature one pound of air carries 110 grains of moisture.

The sheet 10 is passed between the heated rolls 18 as shown and a constant selected dew point temperature of 70° is maintained by recirculation of air in controlled quantities through the duct 23. Should the dew point within the chamber 12 tend to fall below the 70° selected, the thermostat 24 will act to cause the motor to move the damper vanes 27 to increase the volume of recirculating air flowing through the duct 23 and to diminish the amount of outside air entering the conduit 19 through its open end. Should the dew point within the housing 12 tend to go above the selected maximum of 70°, the motor 26 will operate in reverse to tend to close the dampers in the duct 23 and to open the dampers in the conduit 19.

The rate of evaporation of the moisture in the sheet 10 is directly as the difference between the moisture temperature, established by the heated rolls 18, and the dew point of the environment. The dew point of the environment being maintained substantially constant by the recirculation of a portion of the air discharged from the chamber as above described, absolute control of and uniformity in the rate of evaporation or drying of the sheet 10 is obtained regardless of atmospheric temperature and humidity conditions which without the control would affect the rate of drying. The foregoing described process for drying felt is also applicable for drying any similar product in the form of a web or a sheet uninfluenced by temperature and humidity conditions of the outside air.

The sheet 10 upon leaving the pre-drying chamber 12 passes through an upper and a lower series of rolls in the impregnator vat 13, the upper rolls being designated by the numeral 30 and the lower by the numeral 31. Both series of rolls are arranged in horizontal planes, the upper rolls 30 being above the hot asphalt bath 32 and the lower rolls 31 being immersed therein. The asphalt bath 32 preferably has a temperature of approximately 400° F. and the arrangement of the rolls is such that the sheet 10 is alternately passed between two contiguous upper rolls 30, and then between two contiguous lower rolls 31 so that the sheet is intermittently subjected to a series of dipping actions in the bath.

The described alternate immersion in and removal of the sheet 10 from the hot asphalt bath disperses dense fumes and volatiles from the surface of the sheet after each immersion and to avoid contamination of the atmosphere and fire hazard within the plant, the impregnator vat 13 is enclosed by the housing 33 illustrated diagrammatically by dotted lines in Fig. 1. The nature of the fumes and volatiles is such that they cannot be drawn off through a blower since the blower blades would rapidly foul and thereby become inoperative.

The fumes are discharged from the housing 33 through a conduit stack 34 terminating at some distance above the factory building in which the plant is housed so as to avoid outside fire hazard and to minimize contamination of the surrounding atmosphere. The conduit 22, providing the discharge outlet for air from the pre-drying chamber 12, is connected with the vat housing 33 as illustrated in Fig. 1. The air discharged from the chamber 12 by the operation of the blower 21 is forced through the housing in sufficient quantity and velocity to carry all of the fumes out of the housing and to discharge the same through the stack 34. The draft of air passing through the housing 33 also produces an incipient cooling of the impregnated felt sheet 10 and this tends to accelerate the rate of cooling of the sheet in the preliminary cooling chamber 14 into which it passes upon its discharge from the housing. The sheet 10 is cooled to approximately 200° F. in the chamber 14, the cooling being accelerated by causing the sheet to hang in a plurality of festooned loops. Apparatus is provided for manipulating and moving the sheet 10 through the chamber 14 in festoon formation. The apparatus is indicated diagrammatically in part only and is not described or further illustrated since it forms no part of the invention. From the chamber 14, the sheet 10 passes in operative proximity to the asphalt coater 15, where its temperature is again raised. The hot sheet 10 then passes sequentially in operative relation to the sand coater 16, and to a suitable mica applicator, not shown, whereby the sheet is given a coating of asphalt and sand on one side and of mica on the other.

The completed sheet 10, coated as described, enters the cooler chamber 17 where it takes the form of festooned loops 35 suspended from contiguous bars 36 attached at each end to a pair of moving continuous chains 37, actuated in any suitable manner by sprockets 38.

The rate of travel of the bars 36 carried by the chains 37 is so proportioned to the rate that the sheet 10 is advanced as it enters the housing 17, that the festooned loops 35 extend downwardly a distance relative to the depth of the housing approximately as shown. The cooler housing 17 is shown diagrammatically and the actuation of the chains 37 by the sprockets 38, and the tracks, guides, and other apparatus, cooperating to provide the festoon loop suspension of the sheet 10 in the housing, are not further described since the festoon arrangement is old and well known in the art and no novelty amounting to invention is claimed therein. The sheet 10 is cooled in the housing 17 to a selected temperature within the range of 75° F. to 100° F., by the simultaneous application of moisture to the sheet under conditions such that it is cooled thereby without saturation and by the delivery of air into the housing, preferably in the form of jets.

A supply pipe 39, connected with a suitable source of water, projects into the product ingress end of the housing 17 as shown in Figs. 2, 4 and 9. A transversely extending conduit 40 comprising a plurality of pipe sections 41 is connected with the pipe 39 by an L 42. The pipe 39 is adapted to be partially and completely opened and closed to the passage of water by a solenoid valve 43 and also by a modulating valve 44. A plurality of nozzles 45, connected by the pipe sections 41 comprising the conduit 40, are so positioned and inclined as to discharge water, preferably in the form of finely divided sprays impinging over the full width of the uncoated or unfinished face of the entering sheet 10 contiguous to the particular adjacent moving bar 36 supporting the sheet as it moves downwardly to form the contiguous loop 35.

The conduit 40, being positioned within and close to the ingress end of the housing 17 and adjacent to the top thereof where the entering sheet 10 is at its maximum temperature, the greater portion of the water forming the sprays impinging on the sheet flash into steam. Very little, if any, of the water is absorbed by the sheet 10 and such as is absorbed is quickly evaporated. The application of the water sprays to the hot sheet 10 as described utilizes the water solely as a cooling medium in cooperation with the air jets delivered into the housing 17 as hereinafter described. Discoloration of the coated or finished surface of the sheet 10 may be avoided by confining the impingement of the sprays to the uncoated or unfinished side of the sheet as shown so that there is no possibility of the finished face of the product coming from the housing with moisture adhering thereto. However, if desired, apparatus may be provided adapted to deliver water on either or both sides of the sheet. That portion of the water sprays, not changed into steam or otherwise carried off as hereinafter described, flows down into a tank 46 provided for that purpose in the bottom of the housing 17 and from which it flows through an outlet, not shown.

An air circulating or ventilating ssytem is provided for cooperation with the water sprays in cooling the product in the housing 17. One entire side of the housing is illustrated as providing a plurality of air inlet ports 47 preferably arranged in vertical tiers as shown and with the ports of each tier in longitudinal alignment with the corresponding ports in the other tiers. Arrangement of the ports 47 in vertical tiers and in longitudinal alignment, as shown, is preferable since they more efficiently control the ingress of air than if positioned or arranged at random. Each port 47 is bounded at the top and bottom by a pair of walls 48. The walls 48 of the upper ports 47 of each vertical tier are substantially inclined to the horizontal and the bounding walls 48 of the other ports are successively less inclined to the horizontal with the lowermost port in each tier preferably bounded at the top and bottom by horizontally extending walls 48.

The ports 47 connect the interior of the housing 17 with a chamber 49 extending substantially the full length of the housing and supplied with air under pressure as hereinafter more particularly described. Each port 47 is equipped with a plurality of transversely extending vanes 50 adapted to divide the air flowing through each port into a plurality of jets. The longitudinal spacing of the vertical tiers of ports 47 is substantial and the vanes 50 are so inclined and arranged that the air jets from contiguous ports in adjacent tiers intermingle. The described construction of the ports 47 and the arrangement of the vanes 50 for each port is such that the entering air is delivered in jets throughout the entire housing 17 with the lowermost jets substantially horizontal and the others successively inclined to the horizontal in greater degree than the next lower jet as best shown in Fig. 4. The ports 47 are shown as provided in only one side wall of the housing 17 but it is understood that means may be provided for admitting air through both side walls or the bottom of the housing if desired.

The air is discharged from the housing 17 into an exhaust conduit or duct 51 through a plurality of exhaust openings 52 in the top wall of the housing. Air is delivered into the housing 17 through the ports 47 from the chamber 49 by the operation of a blower 53. The blower 53 is preferably motor actuated and is positioned in the exhaust conduit or duct 51 as illustrated in Fig. 6, so that the entire housing is under less than atmospheric pressure to avoid possibility of steam and lubricating agents being forced out of the housing into the enclosing structure as would happen if the blower were positioned in the supply conduit 55. The blower 53 delivers the air exhausted from the housing 17 into a discharge conduit 54, connected as shown in Fig. 6 with an air inlet conduit 55 by means of a by pass duct 56.

The air delivered at controlled temperature into the housing 17 in jets cooperates with water sprays discharged by the nozzles 45 to initially cool the sheet 10. In the initial phase of cooling, the air jets adjacent to the water sprays serve primarily as steam carriers. The simultaneous introduction of water sprays and of lateral air jets at the ingress end of the housing which all impinge on the surface of the individual loops 35 as they are being formed, effects a rapid cooling of the sheet 10 by the resulting transfer of sensible heat from the sheet to both the water and the air. The simultaneous impingement of the moisture and the air upon the sheet 10 in this end of the housing also accelerates the cooling of the product by converting sensible heat to latent heat on the surface of the sheet and in intimate contact therewith as the moisture is evaporated from the surface.

The secondary or final phase of cooling occurs in that portion of the housing where no water is delivered and results from the air contacting directly with the sheet 10. The direct contact of the air with both sides of the sheet 10 not only evaporates any moisture that might have collected on the coated or finished face and dries the uncoated or unfinished face upon which the water sprays directly impinge, but the air also cools the sheet to the selected temperature, preferably within the range of 75° to 100° at which it is discharged from the housing.

The air, delivered as described, into the chamber 49 at a constant rate through the conduit 55 and from the conduit into the housing 17, is maintained at suitably controlled temperatures by means and for a purpose hereinafter more particularly described. Devices are also provided for automatically changing the rate or volume of the water delivered into the housing 17 in the form of finely divided sprays to cool the sheet 10 to the selected constant temperature. The volume of water required to cool the sheet 10 to a selected temperature is necessarily changed from time to time to compensate for unavoidable variations in the rate of production, for variations in the original temperature of the sheet 10 as it enters the housing, for variations in the mass or thickness of the product, and also to compensate for other environmental variables as they respectively occur. The fluctuations in the amount of water so delivered are automatically obtained in accordance with the requirements as determined by resulting slight changes in the temperature of the sheet 10 as it leaves the housing 17. One of the features contributing to the compensation for the aforesaid variables is the automatic control of the temperature of the air entering the housing, this being done by establishing a fixed dry bulb temperature at the manufacturing site. This control of temperature of the air entering the housing 17 eliminates weather and other extraneous influences as factors affecting the rate of production and is accomplished by recirculating a portion of the air being currently discharged from the housing 17 with outside air being drawn into the housing through the air inlet conduit 55.

Operation of the blower 53 draws air from the housing 17 through the exhaust duct 51 and recirculates a portion or all of the air so drawn off by returning it through the by pass duct 56 and the air inlet conduit 55. Dampers 57 and 58 respectively mounted in the discharge end of the duct 51 and in the by pass 56 are provided to automatically regulate the amount of air so recirculated. The dampers 57 and 58 are operatively connected by a rod 59 in such a manner that as the damper 57 is moved towards open position, the damper 58 is correspondingly moved towards closed position and vice versa. The dampers 57 and 58 are actuated by a reversing motor 60 operatively connected with the damper 58 by means of a rod 61. Operation of the motor 60 is controlled by a thermostat 62 operatively connected with a dry bulb thermometer 63 positioned in the air inlet conduit 55. Obviously, operation of the blower 53 delivers as much air through the conduit 55 and into the chamber 49 and housing 17 as it draws out of the housing through the discharge conduit 51. When the damper 58 is open or partially open a portion of the air so drawn off from the housing 17 is recirculated or returned to the housing and when the damper 57 is closed no air will be recirculated but all is drawn from the outside through the open end of the conduit 55. Except for unusual conditions of operation the air delivered into the housing 17 through the conduit 55 is in part outside and in part recirculated air, the proportions depending upon the amount the dampers 57 and 58 are open. The dry bulb thermometer 63 is positioned at such a distance from the junction of the by pass duct 56 with the conduit 55 that the outside and recirculated air are thoroughly mixed in the conduit before contacting with the thermometer.

The temperature of the air admixture in the conduit 55 at the thermometer 63 depends upon the temperature and proportions of the outside and recirculated air respectively. Since the function of the ventilating system is the cooperation of the circulating air with the water sprays to cool the product, it may be stated in general that the cooler the air delivered to the housing 17 the more efficient will be the cooling of the product. However, since the recirculated air has a substantial moisture content it is desirable that the temperature of the admixture in the conduit 55 be not less than 35° F. as otherwise there is a tendency for the moisture content to congeal. Assuming the thermometer 63 is set to operate around 35° F., and should the admixture of outside and recirculated air approach approximately that temperature, the thermostatic control 62 starts operation of the damper motor 60 in a direction tending to open up the damper 57 positioned in the by pass duct 56 and to close the damper 58 positioned in the discharge end of the conduit 54. The damper motor 60 is preferably constructed to move rather slowly and at a rate such that it requires approximately four minutes for the motor arm 64 to travel through an arc of 60° which is the maximum movement of the arm requisite to actuate the dampers 57 and 58 from open to closed position and vice versa. Under normal conditions of operation the air discharged from the housing 17 is of relatively high temperature by reason of its contact with the hot sheet 10 and is of a higher temperature than the outside air, and as a result the damper 58 is partially open under normal conditions of operation. A manually operable damper 65, is positioned in the discharge end of the conduit 54, contiguous to the thermostatically controlled damper 58. The damper 65 supplements the automatically controlled dampers 57 and 58 and permits a greater degree of flexibility in operation. The manually operable damper 65 and the automatically controlled dampers 57 and 58 permit a fixed volume of air to be drawn off from and also to be delivered into the housing 17 by the operation of the blower 53, the dampers, however, being adapted to vary the proportions of outside to recirculated air. The air delivery means is shown and described as discharging through one side of the housing but it is understood that apparatus may be provided for delivery through both sides if desired.

The volume of water delivered into the housing 17 in the form of sprays and the temperature and fixed volume of air simultaneously delivered into the housing in the form of jets as described, determine the rate of cooling of the sheet 10 from its original high temperature, as it entered the housing, to the relatively low temperature of the sheet at or near a discharge port 66 provided in the opposite or egress end of the housing. Obviously, any fluctuations of air temperature in the housing 17 and particularly the fluctuations thereof adjacent the discharge port 66 are proportional to and are approximately indicated by corresponding temperature fluctuations in the sheet 10 as it is discharged from the housing. The variations in the exit temperature of the sheet 10 from a selected normal are utilized to correspondingly and automatically vary the amount of moisture delivered to the housing 17 and thereby to control the rate of cooling and the exit temperature of the sheet at the port 66 and to maintain said exit temperature within a narrow range above and below the selected normal.

The sheet 10 upon leaving the housing 17 is passed over a device sensitive to any fluctuations in the exit temperature of the sheet. The device, generally designated by the numeral 67, is positioned contiguous to the port 66 in the housing 17 through which the sheet is discharged. The device 67 is shown diagrammatically in perspective in Fig. 7 and includes two spaced apart tubes 68 filled with material inert to heat, such as magnesium or the like. The tubes 68 are separated by a restricted space 70 in one end of which is positioned a dry bulb thermostatic element 69. The bottom and ends of the space 70 are bounded by sheets 71 of any suitable heat insulating material. The top of the space 70 is covered and closed by the sheet 10 resting on and slidably movable over the tubes 68 so that the space is entirely enclosed except that the end adjacent the element 69 provides an air port or outlet.

Means is provided for delivering air into the space 70 at a constant rate and at a selected constant temperature substantially higher than either the maximum atmospheric temperature of the environment or the maximum temperature of the sheet 10 as it passes over the space. Outside air is delivered into the space 70 through a conduit 74 preferably by operation of an electrically actuated blower 75 positioned in the conduit. The conduit 74 has an open end divided by a partition plate 84 into two ducts 85 and 86 as best shown in Fig. 11. Two connected dampers 76, positioned in the ducts 85 and 86, respectively, are connected by a link 87 and are so arranged as to permit a total constant flow of air through the conduit 74 regardless of the position of the dampers. The constant high temperature of the air delivered through the conduit 74 into the space 70 is maintained by an electrical heater 83 mounted in the duct 86. The position of the dampers 76 and the resulting constant temperature of the air delivered at a constant rate into the space 70 is controlled by a dry bulb thermostatic element 77 positioned in the conduit 74 and by a thermostatic control element 78, operatively connected with the thermostatic element and with a damper reversing motor 79. The motor 79 is operatively connected with the dampers 76 by means of a link 80. The thermostatic control 78 may be set for any selected temperature and in practice a setting of 175° for the air stream delivered into the space 70 is found satisfactory for a selected approximate temperature of 100° for the sheet 10 moving over the space. The thermostatic element 77, control 78, motor 79 and dampers 76 are so operatively connected that the dampers are moved in the direction of closure to increase the volume of air delivered through the heater 83 if the temperature of the air in the conduit 74 tends to fall below the selected 175°, and the dampers are oppositely moved to diminish the rate of flow through the heater 83 when the temperature of the air in the conduit tends to rise above the selected 175° temperature. This arrangement results in a stream of air of constant volume entering the space 70 at the selected constant temperature and its movement in close contact with the sheet 10. Obviously, the temperature of the air stream in the space 70 is affected by variations in the temperature of the sheet 10. If the sheet 10 is at the 100° or other selected normal discharge temperature there will be a normal transfer of heat from the air stream in the space 70 to the material sheet, and the temperature at the thermostatic element 69 will remain static or normal. If the sheet 10 is too hot or above the 100° or other selected temperature that condition will result in a reduced heat transfer from the air stream in the space 70 to the sheet and the temperature of the air at the element 69 will be above normal as a result. Conversely if the material sheet 10 is too cool or below the selected temperature there will be an increased transfer of heat to the sheet from the air stream and the temperature at the thermostatic element 69 will be below normal.

The element 69 is operatively connected with a thermostatic control 81 set for a temperature of the air stream at the point of contact with the element corresponding to the 100° or other selected delivery temperature of the material sheet 10 upon its discharge from the housing 17. Since the temperature of the air stream in the space 70 is greatly in excess of the temperature of the material sheet 10 regardless of variations in the temperature of the latter there is always a transfer of heat from the air stream to the material sheet and a corresponding drop in temperature in the air stream between its point of initial entry into the space 70 and its point of contact with the element 69.

The thermostatic element 69 is positioned at a substantial distance from the exit end of the air space 70 to adapt the device for use with various widths of material sheets 10 since it is desirable that all of the space 70 between the element and the air inlet end be covered with the material sheet regardless of the width of the latter. With the thermostatic control 81 set to correspond to an initial temperature of 175° of the air stream and with the element positioned at approximately 36 inches distance from the inlet end of the air space 70 and assuming a selected normal temperature of 100° for the material sheet 10, it is found that a 6° fluctuation from normal of the temperature of the sheet 10 will cause a corresponding approximate fluctuation of 1° in the temperature of the air stream at its point of contact with the element.

The control 81 is sensitive to and operable by changes in temperature at the element 69 as slight as a fraction of a degree and is operatively connected with a reversing motor 82 provided for opening and closing of the modulating valve 44 controlling the pipe 39 as shown in Fig. 9. The motor 82 rotates an arm 83 to actuate links 88 and 89 so arranged and connected that operation of the motor in one direction due to temperature above the selected normal at the element 69 in the space 70 tends to open the valve 44 and to increase the amount of water discharged into the housing 17 through the nozzles 45. Operation of the motor 82 in the opposite direction due to the temperature at the element 69 being below the selected normal temperature tends to close the valve 44 and thereby diminish the amount of water delivered into the housing.

The device 67 is operable as above described by variations in the sensible heat transfer from the air in the space 70 to the relatively cool sheet 10 to maintain conditions in the housing 17 such that the sheet is discharged from the housing at a substantially constant selected temperature and in thoroughly dry condition. The device 67 also operates to quickly close the modulating valve 44 to entirely stop or substantially check the flow of water into the housing 17 through the nozzles 45 should the sheet 10 be moist upon its discharge from the housing as may happen occasionally under abnormal conditions, due to sudden changes in temperature or humidity of the atmosphere or other sudden or unusual changes in environmental conditions. The immediate complete or substantial closure of the valve 44 results from a sudden drop in the temperature of the air stream at the element 69 in the space 70, produced by the latent heat of evaporation of the moisture carried by the sheet. The diminished or complete cessation of water tends to quickly correct the abnormal condition resulting in the sheet 10 being discharged in a damp condition, and the sheet continues thereafter to be discharged in its usual dry condition, wherein the device is influenced only by the transfer of sensible heat from the air in the space 70 to the sheet and the temperature of the sheet at the port 66 is maintained within a narrow range.

The device 67 is so arranged and adjusted that the modulating valve 44 is partially open under normal operating conditions, the amount of such opening being automatically controlled by the operation of the motor 82 as actuated by the thermostatic element 81. Since water sprays are impinged upon the hot sheet 10 only for the purpose of cooling it, and absorption of moisture by the sheet is to be avoided, it is important that the flow of water through the pipe 39 be stopped instantly in the event that the portion of the sheet 10 upon which the sprays impinge should for any reason become stationary. That portion of the sheet 10 upon which the sprays impinge is constantly advanced only while the chains 37 and sprockets 38 are in operation. The solenoid valve 43 is made operable to close the pipe 39, independently of the modulating valve 44, by providing a device consisting of an electrical generator 90 operatively connected with one of the sprockets 38 as best shown in Figs. 4 and 9. The generator 90 is electrically connected with the solenoid valve 43 and is so constructed that it maintains the valve in open position while the chains 37 and the sprockets 38 are in motion, and permits instantaneous closure of the valve when the generator stops due to the sprockets 38 coming to a standstill. Since the sheet 10 becomes stationary at the ingress end of the housing only when the valve 43 is closed, there is no possibility of impingement of water sprays on the sheet 10 while it is stationary.

Thus it will be seen that the invention provides a novel method and means for uniformly drying a sheet of raw material at a uniform rate uninfluenced by changes in atmospheric temperature and humidity or by other environmental changes. The invention also provides a novel method and means for delivery of air into and the recirculation of air through a cooling chamber at automatically controlled temperatures uninfluenced by the temperature of the outside air, and also provides a novel method and automatically operable means for controlling the volume of cooling water applied to the product in accordance with fluctuating conditions of temperature, humidity and the like, whereby the discharge temperature of the product is maintained substantially uniform under all conditions of operation, and whereby there is no delivery of cooling water to the product while it is stationary. As a result of the foregoing improvements pre-drying of material and the subsequent cooling thereof may be accomplished at a uniform selected rate whereby material such as roofing can be manufactured as rapidly in one season as another and uninfluenced by ephemeral changes in atmospheric temperature and humidity.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. The method of eliminating outer atmospheric temperature and humidity as factors influencing the rate of cooling of a hot sheet of material of the kind described, which consists in advancing the sheet through a limited environmental space, causing moisture to contact with the advancing sheet in said space and then circulating air of substantially constant temperature through said space and selectively controlling the quantity of said contacting moisture in accordance with fluctuations in temperature of the sheet upon leaving said space.

2. The method of eliminating outer atmospheric temperature and humidity as factors influencing the rate of cooling of a hot sheet of material of the kind described toward a predetermined temperature, which consists in advancing the sheet through a limited environmental space, discharging moisture upon the advancing sheet upon its initial entry into said space, drying the sheet while it continues through said space and automatically varying the quantity of said discharged moisture in accordance with fluctuations in the temperature of the sheet relative to the predetermined temperature at the exit place where the sheet leaves said space, whereby the exit temperature of those portions of the sheet which receive the varying quantities of moisture is maintained substantially at said predetermined exit temperature when leaving said space.

3. The method of cooling a hot sheet of the kind described toward a predetermined temperature within a selected range uninfluenced by outer atmospheric temperature and humidity, which consists in advancing the sheet through an enclosed space, impinging water sprays upon the sheet during its initial entry into said space, circulating air of predetermined humidity through said space, and selectively varying the quantity of said sprays in accordance with such fluctuations in exit temperature of the sheet from said selected temperature as may occur in said space whereby the exit temperature of those portions of the sheet which receive the varying quantities of moisture is maintained at substantially said predetermined temperature when leaving said space.

4. The method of cooling a sheet of the kind described toward a predetermined temperature within a selected range uninfluenced by outer atmospheric temperature and humidity, which consists in advancing a sheet through a housing, discharging moisture upon the sheet upon its initial entry into the housing, passing air through the housing at a constant rate, recirculating a portion of said air after mixing it with outside air in proportions to selectively control the temperature of the admixture, maintaining the exit temperature of the sheet at approximately said predetermined temperature by increasing the quantity of said discharged moisture when the temperature of the sheet adjacent its exit from the housing is above the predetermined temperature, and by decreasing the volume of said discharged moisture when said exit temperature is below said normal temperature.

5. In apparatus for cooling a hot sheet of material of the kind described toward a predetermined temperature within a selected range, the combination of a cooler housing, means for advancing the sheet through the housing, and automatically controlled means for impinging water sprays upon the sheet within the housing in volumes fluctuating with variations in the exit temperature of the sheet from said predetermined temperature, said automatically controlled means operating to increase the quantity of the spray when said exit temperature is above said predetermined temperature and to decrease said quantity of the spray when said exit temperature is below said predetermined temperature.

6. In apparatus for cooling a hot sheet of material of the kind described toward a predetermined temperature within a selected range, the combination of a cooler housing, means for advancing the sheet of material through the housing, means for passing air at constant rate and controlled temperature through the housing, means for impinging water sprays upon the sheet of material upon its initial entry into the housing, and means automatically operable to vary the quantity of said sprays in accordance with fluctuations in the exit temperature of the sheet of material from said predetermined temperature.

7. In apparatus for cooling a hot sheet of material of the kind described toward a predetermined temperature within a selected range, the combination of a cooler housing, means for advancing the sheet of material through the housing, means for controlling the temperature of air delivered into the housing, a plurality of nozzles for impinging water sprays upon the sheet upon its initial entry into the housing, a pipe for delivering water to said nozzles, a modulating valve operable to control the flow through said pipe and thereby to vary the quantity of said water sprays, and means automatically operable in accordance with fluctuations in the exit temperature of the sheet from the predetermined temperature to correspondingly open and close the valve and thereby to respectively increase and diminish the quantity of said sprays whereby to cause said exit temperature of those portions of the sheet of material which receive the varied quantity of water sprays to be at approximately said predetermined temperature.

8. In apparatus for cooling a hot sheet of material of the kind described toward a predetermined temperature within a selected range, the combination of a cooler housing, means for advancing the sheet through the housing, a plurality of nozzles adapted to impinge moisture upon the sheet immediately upon entering the housing, a pipe for delivering moisture to the nozzles, a modulating valve movable to open and close the pipe, an elongated hollow casing positioned adjacent the exit end of the housing, said casing having an air inlet port at one end, an air exit port at the other end and an opening extending along one side, said sheet providing a closure for said opening as it leaves the housing, means for passing a stream of air through the casing at a constant rate and at a uniform inlet temperature substantially higher than said predetermined exit temperature of the sheet, a thermostatic element positioned in said casing at a substantial distance from the inlet port and in the path of said air stream, and means operatively connecting said element with said modulating valve to move the valve in the direction of opening and closing, respectively, as the temperature of the air stream at said element rises and falls.

9. In apparatus for cooling a sheet of material of the kind described toward a predetermined temperature within a selected range, the combination of a cooler housing, means for advancing the sheet through the housing, means for discharging moisture upon the sheet upon its initial entry into the housing, a dry bulb thermostatic element located at the exit place of the housing and so positioned relative to said sheet as to be influenced by fluctuations in the temperature thereof at its exit from the housing, and means operatively connecting said element with said moisture discharging means to increase the quantity of moisture so discharged as the exit temperature of the sheet rises above the predetermined temperature and to diminish the quantity thereof as the exit temperature of the sheet falls below said predetermined temperature.

10. In apparatus for cooling a hot sheet of material of the kind described toward a predetermined temperature within a selected range, the combination of a cooler housing, means for advancing the sheet through the housing, means for circulating air through the housing, means for controlling the temperature of air delivered into the housing, means for impinging water sprays upon the sheet upon its initial entry into the housing, a dry bulb thermostatic element located at the exit place of the housing and so positioned relative to said sheet as to be influenced by fluctuations in the temperature thereof at its exit from the housing, and means operatively connecting said element with said water impinging means to increase the quantity of sprays as the exit temperature of the sheet rises above the predetermined temperature and to diminish the quantity of the sprays as the exit temperature of the sheet falls below said predetermined temperature.

11. In apparatus for cooling a hot sheet of material of the kind described toward a predetermined temperature within a selected range, the combination of a cooler housing, means for advancing the sheet through the housing, means for circulating air through the housing, means for controlling the temperature of the air delivered into the housing, a plurality of nozzles adapted to impinge water sprays upon the sheet upon its initial entry into the housing, a conduit for delivering water to the nozzles, a modulating valve movable to open and close the conduit, an elongated hollow casing positioned adjacent the exit end of the housing, said casing having an air inlet port at one end, an air exit port at the other end, and an opening extending along one side, said sheet providing a closure for said opening as it leaves the housing, means for passing a stream of air through the casing at a constant rate and at a uniform inlet temperature substantially higher than said predetermined exit temperature of the sheet, a thermostatic element positioned in said casing at a substantial distance from the inlet port and in the path of said air stream, and means operatively connecting said element with said modulating valve to move the valve in the direction of opening and closing respectively as the temperature of the air stream at said element rises and falls.

12. In cooling apparatus of the kind described, means for advancing a sheet of material, means for discharging moisture on the sheet and mechanism operatively connected with said sheet advancing means to maintain said moisture discharging means in operation during movement of the sheet advancing means and to stop operation of said moisture discharging means when said sheet advancing means is inoperative.

13. The method of cooling a hot sheet of the kind described toward a predetermined temperature within a selected range uninfluenced by outside atmospheric temperature and humidity, which consists in passing the sheet through an enclosed space, wetting the sheet after its initial entry into the enclosed space, passing a definite volume of air through the enclosed space at a constant rate and at a substantially fixed temperature, and selectively controlling the amount of wetting of the sheet in accordance with the fluctuations in temperature of the sheet as the latter passes out of the enclosed space.

14. The method of cooling a hot sheet of the kind described toward a predetermined temperature within a selected range uninfluenced by atmospheric temperature and humidity, which consists in passing the sheet through an enclosed space, wetting the sheet after its initial entry into the enclosed space, passing a definite volume of air through the enclosed space at a constant rate and at a substantially fixed temperature, and selectively controlling the amount of the wetting through the utilization of and substantially in direct proportion to the residual heat still retained by said sheet as the latter passes out of said enclosed space.

15. The method of cooling a hot sheet of the kind described toward a predetermined temperature within a selected range uninfluenced by outside atmospheric temperature and humidity, which consists in passing the sheet through an enclosed space, spraying liquid against the sheet over a given area after the same has entered said enclosed space, passing a predetermined volume of air through the enclosed space at a constant rate and substantially at a fixed temperature, and selectively controlling the volume of the liquid spray applied to said sheet by moving the same out of said enclosed space and in contact with independently and uniformly heated air for obtaining a heat differential therebetween and said sheet, which differential is directly utilized for controlling the quantity of said liquid spray as applied to said sheet.

16. In apparatus for cooling a hot sheet of material of the kind described toward a predetermined temperature within a selected range, the combination of a cooler housing, means for advancing the sheet through the housing, means for passing air at constant volume and controlled temperature through the housing, means for impinging water sprays upon the sheet upon its initial entry into the housing, and means automatically operable to vary the quantity of said sprays in accordance with fluctuations in the exit temperature of the sheet from said predetermined temperature, comprising a chamber unit having an open side and disposed substantially in the path of the sheet adjacent the point where said sheet leaves the housing, said sheet coacting with said chamber unit to form longitudinal duct means, and cooperative means associated with said longitudinal duct means and operably connected with said water spray means to vary the quantity of water of the sprays in proportion to the temperature in said longitudinal duct means.

17. In apparatus for cooling a hot sheet of material of the kind described toward a predetermined temperature within a selected range, the combination of a cooler housing, means for advancing the sheet through the housing, means for passing air at constant volume and controlled temperature through the housing, means for impinging water sprays upon the sheet upon its initial entry into the housing, and means automatically operable to vary the quantity of said sprays in accordance with fluctuations in the exit temperature of the sheet from said predetermined temperature, comprising a duct unit open at one side and disposed at the exit end of said housing and having the open side thereof arranged to be closed by the sheet itself, means for moving air at a constant rate and at a substantially predetermined temperature through said duct unit and in contact with said sheet, and thermal responsive means disposed in said duct unit and sensitive to the temperature differential variations therein and connected with said water spray means to vary the quantity of water of the sprays in proportion to the temperature fluctuations in said duct unit.

18. In apparatus for cooling a hot sheet of material of the kind described toward a predetermined temperature within a selected range, the combination of a cooler housing, conveyor means for advancing the sheet through the housing, and an automatically controlled unit for impinging water sprays upon the sheet within the housing, said automatically controlled unit including a first means responsive to the fluctuations in the temperature of the sheet from said predetermined temperature as taken adjacent the exit end of said cooler housing to increase or decrease the quantity of water sprays, and also a second means responsive to the motion of the sheet conveyor means through said housing and connected to stop the spraying of water at any time that advance of the sheet through the housing is halted.

19. In apparatus for cooling a hot sheet of material of the kind described toward a predetermined temperature within a selected range, the combination of a cooler housing, conveyor means for advancing the sheet through the housing, and a water unit for impinging sprays of water upon the sheet within the housing, comprising a water supply conduit, a first control means for decreasing or increasing the flow of water through said conduit as determined by the exit temperature of the sheet as the latter leaves the housing, and a second control means responsive to the motion of the sheet conveyor means through said housing and adapted for stopping the flow of water through said conduit whenever the advance of the sheet through the housing is halted.

20. In apparatus for cooling a hot sheet of material of the kind described toward a predetermined temperature within a selected range, the combination of a cooler housing, conveyor means for advancing the sheet through the housing, and a water unit for spraying a designated area of the sheet within said housing, comprising a plurality of nozzles, a water conduit connecting the same, a pair of valves associated with the water inlet end of said conduit, one of said valves being adapted to regulate the volume of water flowing through said conduit, the other of said valves being adapted to interrupt the flow of water through said conduit, and a pair of control units, connected with said valves, respectively, to cause the same to each perform its allotted function, one of said control units being operable and responsive to temperature fluctuations of the sheet from said predetermined temperature as the latter leaves the housing, the other of said control units being operable and responsive to the motion of the conveyor means through the housing.

21. The method of cooling heated sheet material toward a substantially constant and predetermined temperature within a selected range and at a substantially fixed rate in an environment of varying temperature and humidity, which consists in passing said material through an enclosed space in said environment, supplying moisture to said heated material after the latter enters the enclosed space, introducing a definite volume of air into said enclosure at a constant rate and at a substantially fixed temperature, withdrawing an equal volume of air from said enclosure, and automatically governing the quantity of moisture being supplied to said material in accordance with the temperature fluctuations of the material as the latter passes out of the enclosed space.

22. In an apparatus for cooling heated sheet material in an environment of varying temperature and humidity toward a predetermined temperature within a selected range at a substantial constant rate, the combination of a cooler housing in said environment, means for advancing the material through the housing, means for passing air at a constant volume and controlled temperature through the housing, means for supplying water to said material upon its initial entry into the housing, and means automatically operable to vary the quantity of the supplied water in accordance with the fluctuations in the exit temperature of the material from said predetermined temperature.

ROY M. MOFFITT.